United States Patent

Maloney et al.

[11] Patent Number: 6,162,648
[45] Date of Patent: Dec. 19, 2000

[54] PURIFICATION OF INDIUM 111

[75] Inventors: Thomas J. Maloney, Friendswood; Arthur E. Camp, Jr., Fresno, both of Tex.

[73] Assignee: Iso-Tex Diagnostics, Inc., Friendswood, Tex.

[21] Appl. No.: 09/161,211

[22] Filed: Sep. 25, 1998

[51] Int. Cl.[7] ........................ G01N 1/18
[52] U.S. Cl. ............ 436/178; 436/175; 436/176; 436/177; 422/101; 422/102; 210/634; 210/638; 210/660; 210/661
[58] Field of Search .................. 436/178, 177, 436/175, 74, 81, 79; 210/638, 400, 660, 661; 422/101, 102

[56] References Cited

U.S. PATENT DOCUMENTS

| | | |
|---|---|---|
| H1310 | 5/1994 | Peterson et al. |
| 4,387,075 | 6/1983 | Morgart ............... 422/50 |
| 4,472,509 | 9/1984 | Gansow et al. ............ 436/548 |
| 4,902,426 | 2/1990 | Macedo et al. ............ 210/656 |
| 5,130,118 | 7/1992 | Johnson et al. ............ 424/1.1 |
| 5,407,831 | 4/1995 | Jing ............... 436/74 |
| 5,874,004 | 2/1999 | DeWitt ............... 210/634 |
| 5,912,180 | 6/1999 | Stone ............... 436/77 |
| 5,958,374 | 9/1999 | Meares et al. ............ 424/1.65 |
| 5,976,824 | 11/1999 | Gordon ............... 435/29 |

*Primary Examiner*—Jill Warden
*Assistant Examiner*—Patricia Bex
*Attorney, Agent, or Firm*—John R. Casperson

[57] ABSTRACT

Undesirable metal cation contaminants, including cadmium, can be removed from a solution containing Indium-111, on a bed of an anion exchange resin. The thus purified solution can be stored and transported in a polypropylene vial, to prevent the possibility of cadmium entering the solution from a glassware wall and of Indium from being lost from the solution by chemically reacting with a glassware wall. The vial can be sealed with a rubber stopper which has a polytetrafluroethylene coating facing the solution to prevent the possibility of contaminants which could interfere with later uses of the Indium-111 from leaching into the solution from the rubber stopper. Recipients of the Indium-111-containing vial can be provided with a prepackaged column of the anion exchange resin to enable such recipients to remove the cadmium which accumulated in the solution as a product of radioactive decay during shipment.

6 Claims, 2 Drawing Sheets

PURIFICATION OF INDIUM 111

BACKGROUND OF THE INVENTION

In one aspect, this invention relates to a chemical purification process. In another aspect, the invention relates to a container for chemicals. In another aspect, the invention relates to a clean-up kit for use with radioisotopes prior to the manufacture of radiopharmiceutical products with such radioisotopes.

Indium-111 is a radioisotope which is used for radiodiagnostic and radio-therapeutic purposes. Indium-111 (atomic number 49) has a half-life of about 2.8 days and decays by emission of an electron to form cadmium-111 (atomic number 48). The short half-life is beneficial from the standpoint of quickly breaking down when administered to a patient, but is problematic from the standpoint of requiring extremely prompt (and careful) handling of the material between the producer of the radioisotope and the patient. Delays between the time of production of the material its incorporation into a pharmaceutical material, and its administration to a patient result in a decrease in the amount of Indium-111, with a resultant decrease in radioactive potency (curies/volume), and a concomitant increase in the concentration of the cadmium decay product (mass/volume).

Indium-111 is typically received for the preparation of a radiopharmaceutical in a small glass vial which contains a specific dose of Indium-111 chloride in hydrochloric (HCl) acid solution. The dose is typically measured by the radioactive output of the vial, typically in millicuries. The radioactive output is typically a calculated value for a specific time and day. In order to deliver the calculated dose to a target site, it is necessary to transfer all of the Indium-111 in the vial to the target site at the indicated time.

Delivery is typically accomplished by incorporating the Indium-111 into a radiopharmaceutical product. This is typically done by reacting the Indium-111 with an organic moiety, such as a peptide, which will seek the target site when introduced into the patient. The stoichiometries of the reactions between the Indium-111 and the organic moiety, and the radiopharmaceutical and the target site, however, is complicated by the presence of the cadmium, and may be further complicated by the presence of further impurities commonly found in Indium-111 solution, such as iron, lead, zinc, aluminum and copper.

The cadmium competes with the Indium-111 for reaction with the organic moiety, and the cadmium-pharmaceutical competes with the Indium-111 radiopharmaceutical for binding with the target site. Stoichiometry is also complicated by the fact that a significant portion of the indium-111 cannot be easily removed from the vial. Apparently, a portion of the indium can become chemically bound to the glass. Further, the amount of cadmium which is present can be greater than the amount calculated as being present from the decay of the Indium-111 . Apparently, cadmium, as well as other impurities which are inherent to the glass, can be leached out by the solution from the inside of the glass vial.

The glass wall of the vial causes a further complication in delivering a prescribed radioactive dose to the target site. The actual output of the radioactive material in the vial is often different from the measured radioactive output from the vial, due to attenuation or radioactive shielding by the glass wall of the vial, and can be as much as 30% higher.

Simple techniques for removing the cadmium from the Indium-111 solution and for getting all of the Indium-111 from the vial would be very desirable, as this would enable higher quantities of ultra-pure Indium-111 to be delivered to the target site.

Techniques for providing ultra-pure Indium-111 to the end user, and for enabling the end user to better assess the potency of the dose of Indium-111 to be administered would also be desirable.

SUMMARY OF THE INVENTION

It has been found that undesirable metal cation contaminants, including cadmium, can be removed from a solution containing Indium-111, on a bed of an anion exchange resin.

It has been further found that a polypropylene vial containing a sterile solution of Indium-111 chloride in dilute HCl is easily emptied of Indium-111 as the solution does not adhere to the plastic wall of the vial. The solution furthermore does not pick up environmental cadmium from the vial, or other metals, since these materials are not found polypropylene.

With a glass vial, as much as 20% of the Indium-111 remains behind when the vial is emptied. With a polypropylene vial, more than 99% of the Indium-111 is easily emptied from the vial. With a glass vial, the measured radioactivity of the vial is up to 30% less than the actual radioactivity of the Indium-111 in the vial. With a polypropylene vial, the measured activity through the wall of the vial is much closer to actual levels. The use of a polypropylene vial thus results in less waste of Indium-111, a more pure form of Indium-111, and a more easily measured amount of Indium-111.

It has been further found that providing a rubber stopper to seal the vial which has a polytetrafluroethylene coating facing the solution will prevent contaminants which could interfere with the stoichiometries mentioned previously from leaching from the rubber and into the solution. The stopper is preferably formed from vinyl butyl rubber and the coating is preferably Teflon® brand polytetrafluoroethylene.

It is further proposed to provide a column containing a strong anion exchange resin to recipients of an HCl solution of Indium-111, to enable such recipients, prior to further use of the solution, to remove the cadmium which accumulated, due to radioactive decay of the Indium-111, in the solution during shipment.

DETAILED DESCRIPTION OF THE INVENTION

One embodiment of the invention provides a process for purifying a solution of Indium-111 which contains undesirable metal cation contaminants. The process is carried out by contacting the solution with a bed of an anion exchange resin under conditions that retain the undesirable metal cation contaminants on the bed.

The process is effective to remove cadmium from the solution, as well as certain other metal contaminants such as zinc and/or iron. The solution susceptible to treatment in accordance with this aspect of the invention is generally a dilute solution of a strong acid, usually HCl. The bed of resin which is employed in this aspect of the invention is most preferably contained in the form of a strong anion exchange resin in a column and the contacting occurs by flowing the solution through the column. The most preferred resin comprises a strongly basic anion exchange resin which is about 8% cross linked.

Good results have been obtained where the column has been prepped by first flowing an HCl solution through the column to form an HCl-treated column, then flowing an NaCl solution through the HCl treated column to form an NaCl treated column, and then flowing sterile water through the NaCl-treated column. These preparative steps assist in eluting a sterile, nonpyrogenic product.

The anion exchange resin is preferably in a powdered form, generally comprising particles having a particle size predominantly in the range of about to 100 to about 200 mesh. To speed solution flow though the column, it is preferred to employ a sterile gas pressure enhanced head on the column. This can be carried out by injecting a sterile gas into an upper end of the column to push the solution of Indium 111 through the column.

Figure 1:
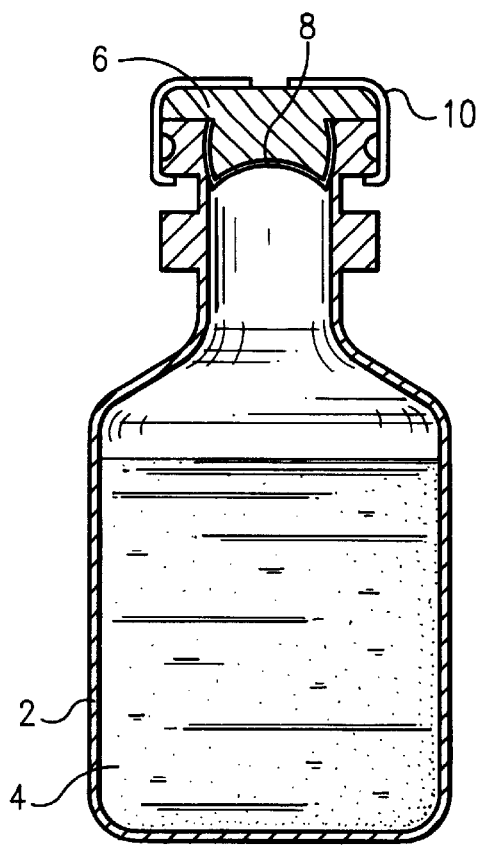
FIG. 1 is a cross-sectional view illustrating certain features of a vial according to one embodiment of the invention.

With reference to FIG. 1, there is provided in accordance with certain aspects of the invention a polypropylene vial 2 containing a sterile solution 4 of Indium-111 chloride in dilute HCl solution. Generally speaking, the vial will contain in the range of from about 0.1 to about 1000 mCi, usually from about 1 to about 500 mCi, of Indium-111 and essentially no cadmium. The volume of the solution will generally range from about 0.05 ml to about 50 ml, usually in the range of from about 0.1 to about 10 ml. The pH will generally range from about 0.1 to about 2.0, usually in the range of from about 0.5 to about 1.5.

Preferably, a rubber stopper 6 seals the vial 2. The rubber stopper 6 preferably forms a pierceable septum and has a polytetrafluroethylene coating 8 facing the solution 4. A metal band 10, generally formed from aluminum, positions the stopper in reliable sealing engagement with the vial.

Generally speaking, the container portion of the invention shown in FIG. 1 is known. It is the use of a container of this type to contain the just described solution of Indium-111 which constitutes this aspect of the invention.

Figure 2:
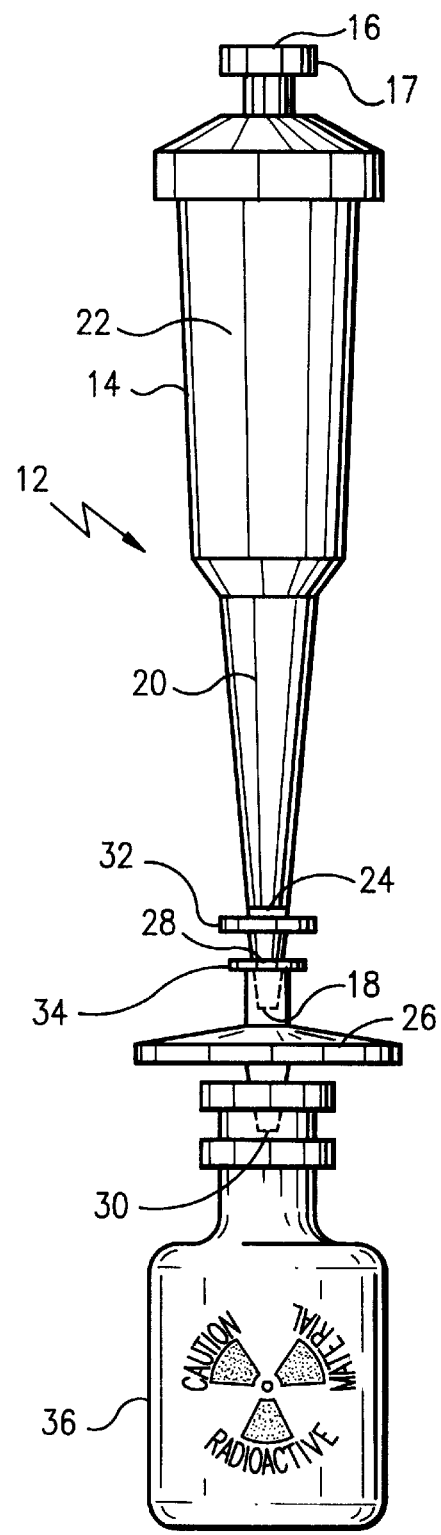
FIG. 2 is a pictorial view illustrating certain features of a kit including a column, a filter, and a vial according to another embodiment of the invention.

FIG. 2 illustrates a column system 12 for removing cadmium from an HCl solution of Indium-111. The column system 12 comprises a column 14 having an upper end 16 and a lower end 18. The lower end defines a column outlet. The upper end is generally sealed by a pierceable septum 17. The column preferably tapers from the upper end to the lower end. A bed 20 of a powdered strong anion exchange resin, which can be as previously described, is positioned in the column 14. The bed is positioned so as to define a gas head space 22 in the upper end of the column beneath the septum 17. A support means 24 for supporting the bed is positioned inside of the column near the lower end thereof A disk-shaped frit forms a suitable support means 24.

The system preferably further comprises a filter means 26 having an upper inlet 28 and a lower outlet 30. The upper inlet 28 is sealingly engageable with the column outlet 18. The filter preferably removes any particles greater than 0.2 microns in size and assures product sterility. A first annular flange 32 is preferably positioned on an outer surface of the column near the lower end thereof A second annular flange 34 is preferably positioned on an outer surface of the filter near the upper inlet end thereof The flanges facilitate attaching their respective items to support apparatus and to each other.

Figure 4:
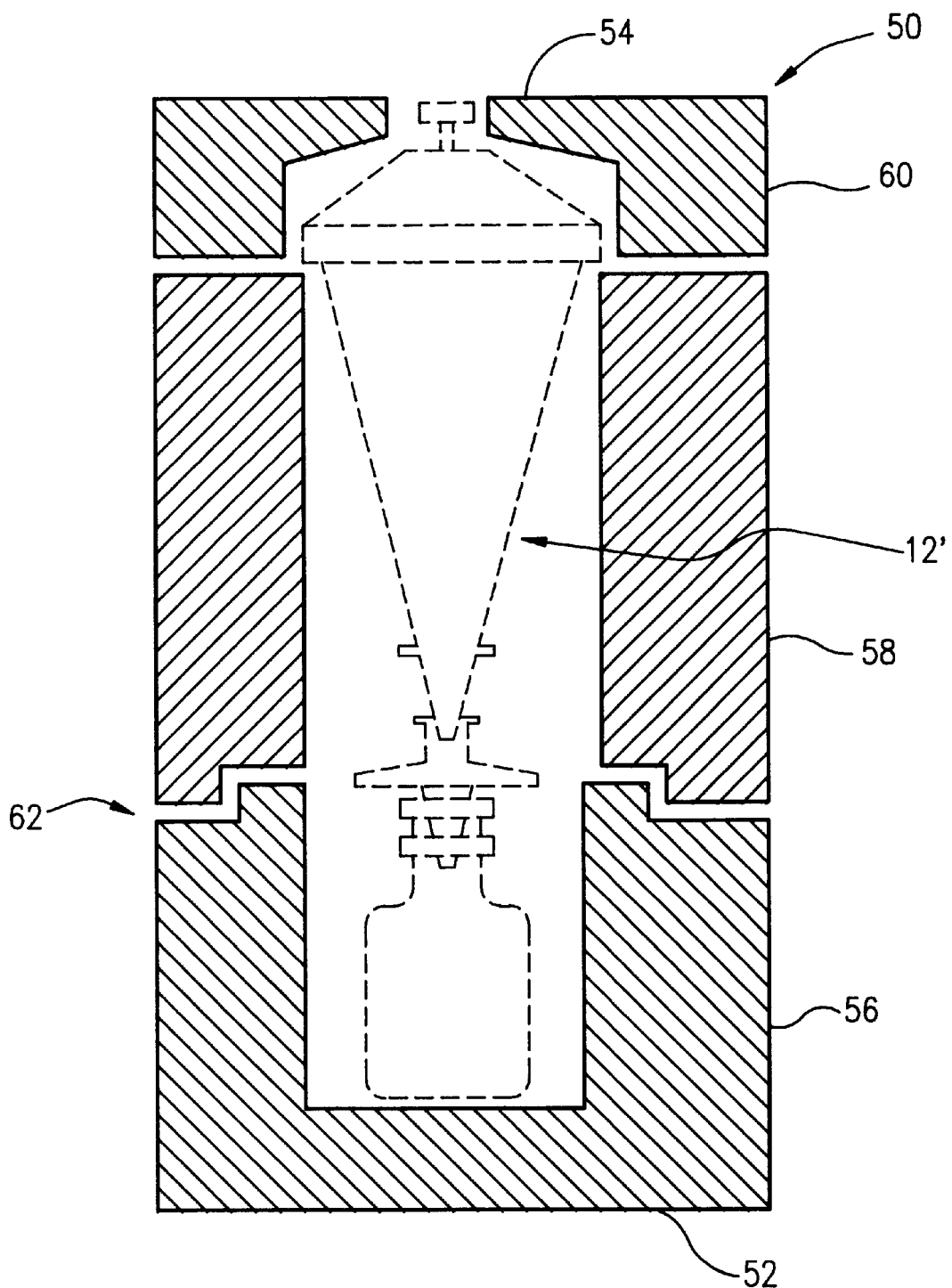
FIG. 4 is a cross sectional view of a radiation protection shield in accordance with certain aspects of the invention containing a kit similar to that shown in FIG. 2 in dashed lines.

FIG. 4 illustrates in cross sectional view a radiation protection shield system 50 containing a column system 12' similar to that described above. To provide adequate shielding for Indium-111, it is preferred that the wall thickness of at least those portions of the shield between the fluid in the column system and the user constitute at least one inch of lead. The system 50 as shown is generally cylindrical in shape, and has a bottom end closure 52 and a top end closure 54. Preferably, the system 50 comprises a lower portion 56 which forms a receptacle for receiving the vial, a tubular extension 58 mounted on an upper end of the lower portion 50 to shield the column, and an upper portion 60 which provides a top streaming shield. The portions of the shield system can be provided with alignment guides such as a tongue and groove structure 62 as illustrated in FIG. 4 to provide additional structural stability and to eliminate a potential radiation leakage path if desired.

The items shown in FIGS. 1–4 provide a kit which can be used by an end user to remove cadmium which has accumulated in a solution of Indium-111 as a product of radioactive decay. The kit would preferably be used immediately prior to utilizing the solution in the preparation and/or labeling of an Indium-111 based radiopharmaceutical. The kit comprises a vial, a column, a filter, a polypropylene receptacle, and a stopper. As used, the kit preferably further comprises a radioactive shield and a sterile air supply.

A suitable vial is exemplified by the sealed vial 2 as shown in FIG. 1. The vial 2 contains a sterile HCl solution 4 of Indium-111.

A suitable column is exemplified by is the column 14 as shown in FIG. 2. The column 14 contains a bed of a powdered strong anion exchange resin to remove the cadmium from the solution upon passage of the solution through the column.

A suitable filter is exemplified by the filter 26 as shown in FIG. 2. The filter 26 removes small particles from the solution after passage of the solution through the bed of powdered strong anion exchange resin and assures sterility.

A suitable polypropylene receptacle exemplified by the sterile polypropylene vial 36 shown in FIG. 2. The vial receives the solution after passage through the filter and has a volume sufficient to accommodate the filtered solution.

Figure 3:
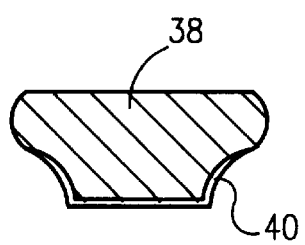
FIG. 3 is a cross sectional view of a stopper well adapted for use with the vial shown in FIG. 2.

A suitable stopper is exemplified by the stopper 38 shown in FIG. 3. This stopper is for sealing the vial 36 of filtered solution, after the removal of the filter 26 and the column 14. The stopper 38 has a polytetrafluroethylene coating 40 and seals the vial.

Certain aspects of the invention are further illustrated by the following example.

EXAMPLE

General

Because cadmium is a ubiquitous environmental contaminant, great care must be taken to insure that the environment including the reagents, column with anion exchange resin, and process equipment such as glassware, if used, and plasticware be essentially cadmium-free. It is preferred to avoid glassware.

Extremely pure water and acids having a cadmium content of well below 1 ppb should be used. The laboratory should be a non-smoking area, since cigarette smoke contains cadmium. Handling should be carried out in a sterile flow hood. Glassware, if used, should be acid washed and plasticware, preferably polypropylene, should be metal free. Gloves should be used in handling the equipment and test tubes and containers should be kept covered to prevent airborne contamination.

Analysis for cadmium may be done by atomic absorption technique and is preferably carried out by electrothermal atomic absorption spectrophotometry (ETAAS). The principle of this technique is based upon the absorption of light at element-specific wavelengths (resonance line) for neutral atoms in the ground state. Solutions suspected of containing cadmium are placed onto a piece of pyrolytically coated graphite and dried. The graphite is heated very quickly by passing an electrical current across it. When the temperature of the graphite reaches the boiling point of the element (or salt), the element forms a gaseous cloud in the light path. The amount of light that is absorbed is proportional to the quantity of ground state neutral atoms formed from the element deposited on the graphite. Preferred ETAAS equipment is provided with a deuterium background correction.

The following information describes the process by which In-111 chloride is purified.

Step 1: Receipt of bulk In-111 chloride solution from radionuclide production facility The bulk In-111 chloride solution is received from the supplier 48 hours post-irradiation of a Cd-112 target The solution consists of the In-111 chloride in a solution of 0.05 N HCl. Specifications from the producer of this radionuclide include the following:

| $Cu^{2+}$ | <2 ng/mCi | $Pb^{2+}$ | <2 ng/mCi |
| $Fe^{3+}$ | <2 ng/mCi | $Zn^{2+}$ | <2 ng/mCi |
| $Cd^{2+}$ | <2 ng/mCi | $Ni^{2+}$ | <2 ng/mCi |

Exemplary metal levels which have been actually measured in the starting material are
$Cd^{2+}$: 2.002 ng/mCi, $Cu^{2+}$: 0.661 ng/mCi, and $Pb^{2+}$: 0.743 ng/mCi.

Step 2: Purification of bulk In-111 chloride solution

Purification of the bulk In-111 chloride solution is performed using column chromatography with a strong anion exchange resin. The strong anion exchange resin was purchased from Aldrich, catalog #21742-5, Dowex 1X8-200 ion exchange resin (Dowex-1-chloride, strongly basic anion. 8% crossing, 100–200 dry mesh).

A. The column is prepared by adding 1.5 Gm of the anion exchange resin to the Biorad column (731–1550). Next, 10 mL of 0.1 N HCl is eluted through the column. After the addition of the 0.1 N HCl, 10 ml of 0.9% NaCl for injection is eluted through the column. Finally, 10 mL of sterile water for injection is eluted through the column.

B. The column is blown dry and then the entire volume of the bulk In-111 chloride solution is applied to the top of the column resin. The solution is passed through the column by application of a stream of air through a sterile syringe attached to the top of the column. The eluted purified solution is collected through a 0.2 µ filter and into a 10-mL sterile polypropylene plastic vial. If more than 20% of the initial radioactivity remains on the column after elution, the column is rinsed with approximately 0.5 ml 0.05 N HCl through the same 0.2 µ filter. Both elutions are then pooled into the same sterile polypropylene plastic vial and assayed.

Step 3: Test to determine cadmium content

A. A 10 µL sample is withdrawn from the sterile plastic vial (Step 2B) and diluted with 1990 µL of 1% nitric acid to yield a 1:200 dilution in a volume of 2 mL.

B. The diluted solution is analyzed for cadmium using an atomic absorption graphite furnace.

Step 4: Target specifications

The product from Step 2 is a sterile, pyrogen-free radiochemical solution presently approved for investigational use only. The active ingredient is In-111 chloride in 0.05 N (+/−0.01 N) HCl (pH 1.0), typically shipped 0.5 ml per vial, specific activity 26.0 mCi/ml, total activity 13.0 mCi. Radionuclide purity is 99.9% (min.) In-111, others 0.1% (max.). Chemical purity is

| $Cu^{2+}$ | <2 ng/mCi | $Pb^{2+}$ | <2 ng/mCi |
| $Fe^{3+}$ | <2 ng/mCi | $Zn^{2+}$ | <2 ng/mCi |
| $Cd^{2+}$ | essentially 0 | $Ni^{2+}$ | <2 ng/mCi |

Exemplary metal levels which have actually been measured in the product are:

| 0.377 ng/mCi $Cu^{2+}$; | 0.181 ng/mCi $Pb^{2+}$; | <2 ng/mCi $Fe^{3+}$; |
| <2 ng/mCi $Zn^{2+}$; | 0.045 ng/mCi $Cd^{2+}$; | <2 ng/mCi $Ni^{2+}$. |

While certain preferred embodiments of the invention have been described herein, the invention is not to be construed as being so limited, except to the extent that such limitations are found in the claims.

What is claimed is:

1. A process for purifying a dilute HCl solution of Indium-111 which contains undesirable cadmium cation contaminant, said process comprising contacting said solution with a bed of an anion exchange resin under conditions to retain the cadmium cation contaminant in the bed, wherein the bed of resin forms a strong anion exchange inside a column and the contacting occurs by flowing the solution through the column, and the column is prepared for purifying the solution of Indium-111 by flowing an HCl solution through the column to form an HCl treated column and then flowing an NaCl solution through the HCl treated column to form an NaCl treated column.

2. A process as in claim 1 further comprising further preparing the column for purifying the solution of Indium-111 by flowing sterile water through the NaCl-treated column.

3. A process as in claim 2 wherein the column has an upper end and a lower end, said process further comprising injecting a gas into an upper end of the column to push the solution of Indium 111 through the column.

4. A process as in claim 3 wherein the anion exchange resin is in powdered form.

5. A process as in claim 4 wherein the anion exchange resin comprises particles having a particle size predominantly in the range of about to 100 to about 200 mesh.

6. A process as in claim 5 wherein the anion exchange resin is strongly basic anion, 8% cross linking.

* * * * *